United States Patent [19]

Weinberg et al.

[11] 4,077,944

[45] Mar. 7, 1978

[54] CATALYTIC PRODUCTION OF POLYESTERS

[75] Inventors: Kurt Weinberg, Upper Saddle River, N.J.; Gordon Carlton Johnson, Armonk, N.Y.

[73] Assignee: Union Carbide Corporation, New York, N.Y.

[21] Appl. No.: 773,000

[22] Filed: Feb. 28, 1977

[51] Int. Cl.² ............................................. C08G 63/38
[52] U.S. Cl. ................................ 260/75 R; 260/47 C
[58] Field of Search ................ 260/75 R, 475 P, 47 C

[56] References Cited

U.S. PATENT DOCUMENTS

| 2,465,319 | 3/1949 | Whinfield et al. ................. 260/75 R |
| 3,451,970 | 6/1969 | Carter et al. ....................... 260/75 R |
| 3,506,618 | 4/1970 | Carter et al. ....................... 260/75 R |
| 3,525,709 | 8/1970 | Somerville et al. ........... 260/75 R X |
| 3,546,179 | 12/1970 | Koller ................................ 260/75 R |
| 3,965,071 | 6/1976 | McClelland ....................... 260/75 R |

*Primary Examiner*—Lucille M. Phynes
*Attorney, Agent, or Firm*—Francis M. Fazio

[57] ABSTRACT

A process for producing polyesters and copolyesters, useful for making films and fibers, by the polycondensation of dicarboxylic acids and aliphatic glycols using certain silicon compounds as catalysts.

8 Claims, No Drawings

CATALYTIC PRODUCTION OF POLYESTERS

BACKGROUND OF THE INVENTION

The production of polyesters and copolyesters of dicarboxylic acids and aliphatic glycols has been carried out commercially for many decades. Among the earliest disclosures relating to this technology is the disclosure in U.S. Pat. No. 2,465,319, issued Mar. 22, 1949. Since this disclosure many variations have been made in the process and many catalysts have been discovered and patented. On Dec. 8, 1970, there issued U.S. Pat. No. 3,546,179 which is directed to the use of compounds containing both the silicon and phosphorus atoms in the molecule as catalysts.

SUMMARY OF THE INVENTION

It has now been found that certain other silicon compounds, as hereinafter defined, are excellent polyesterification catalysts for the production of polyesters and copolyesters useful for making films and other shaped articles.

DESCRIPTION OF THE INVENTION

In the production of polyesters and copolyesters the reaction is generally considered a dual or two stage reaction. In the first stage esterification or transesterification occurs and in the second stage polycondensation occurs. This invention is concerned with novel polyesterification processes.

In the process of this invention, the polyesterification catalysts used are those specific silicon compounds hereinafter more fully defined. The use of these catalysts result in a shorter reaction period, and the production of polyesters and copolyesters of high degrees of polycondensation that are characterized by high melting point, high elongation at break, good tensile strength, high degree of whiteness, and a good stability to heat and light.

The first stage esterification or transesterification reaction is carried out in the traditional manner by heating the mixture of reactants at from about 150° C. to about 270° C, preferably from about 175° C. to about 250° C. During this stage any of the well-known esterification or transesterification catalysts can be used; illustrative thereof one can mention zinc acetate, manganese acetate, cobaltous acetate, zinc succinate, zinc borate, magnesium methoxide, sodium methoxide, cadmium formate, and the like. The concentration thereof is that conventionally used, namely from about 0.001 to about one percent by weight, based on the weight of dicarboxylic acid compound charged. It is preferably from about 0.005 to about 0.5 percent by weight and more preferably from 0.01 to about 0.2 percent by weight.

In the second stage, or the polycondensation, the hereinafter defined silicon catalysts are used. The silicon catalyst is used at a concentration of from about 0.01 to about one weight percent, or higher, based on weight of dicarboxylic acid compound charged, preferably from about 0.02 to about 0.1 weight percent. Any catalytically effective concentration can be employed. As used in this application the term "dicarboxylic acid compound" means both the free dicarboxylic acids and the esters thereof.

The dicarboxylic acid compounds used in the production of polyesters and copolyesters are well known to those skilled in the art and illustratively include terephthalic acid, isoterephthalic acid, p,p'-diphenyldicarboxylic acid, p,p'-dicarboxydiphenyl ethane, p,p'-dicarboxydiphenyl hexane, p,p'-dicarboxydiphenyl ether, p,p'-dicarboxyphenoxy ethane, and the like, and the dialkyl esters thereof that contain from 1 to about 5 carbon atoms in the alkyl group thereof.

Suitable aliphatic glycols for the production of polyesters and copolyesters are the acyclic and alicyclic aliphatic glycols from 2 to 10 carbon atoms, especially those represented by the general formula $HO(CH_2)_pOH$, wherein $p$ is an integer having a value of from 2 to about 10; such as, ethylene glycol, trimethylene glycol, tetramethylene glycol, pentamethylene glycol, decamethylene glycol, and the like. Other known suitable aliphatic glycols include 1,4-cyclohexanedimethanol, 3-ethyl-1,5-pentanediol, 1,4-xylylene glycol, 2,2,4,4-tetramethyl-1,3-cyclobutanediol, and the like. One can also have present a hydroxylcarboxyl compound such as 4-hydroxybenzoic acid, 4-hydroxyethoxybenzoic acid, or any of the other hydroxylcarboxyl compounds known as useful to those skilled in the art.

It is also known that mixtures of the above dicarboxylic acid compounds or aliphatic glycols can be used and that a minor amount of the dicarboxylic acid component, generally up to about 10 mole percent, can be replaced by other acids or modifiers such as adipic acid, succinic acid, sebacic acid, or the esters thereof, or with a modifier that imparts improved dyeability to the polymers. In addition one can also include pigments, delusterants or optical brighteners by the known procedures and in the known amounts.

The polycondensation reaction is generally carried out at a temperature of from about 225° C. to about 325° C., preferably from about 250° C. to about 290° C., at reduced pressure and under an inert atmosphere. These traditional reaction conditions are well known to those skilled in the art.

The silicon compounds that are used as the catalyst in this invention are represented by the following generic formulas:

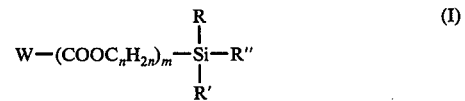

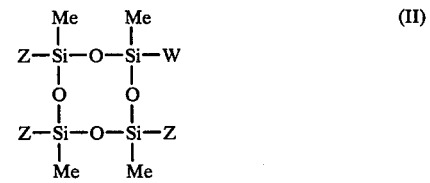

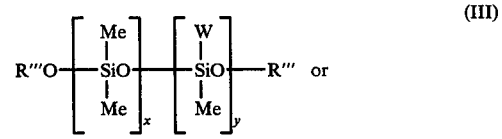

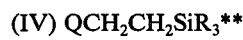

wherein

W is $CH_2=CX-$ or

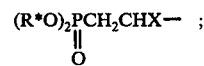

X is hydrogen or methyl and is methyl only when $m$ is one;

R* is alkyl or haloalkyl having from 1 to 4 carbon atoms;

R** is methyl, ethyl, butyl, acetoxy methoxy, ethoxy or butoxy;

R is methyl, ethyl, butyl or trimethylsiloxy;

R' is methyl, methoxy, ethoxy, butoxy or trimethylsiloxy;

R" is methoxy, ethoxy, butoxy, trimethylsiloxy or vinyldimethylsiloxy;

R''' is methyl, ethyl, butyl or trimethylsilyl;

Me is methyl;

Z is methyl or W;

Q is an NH₂CH₂—, NH₂CH₂CH₂NHCH₂—, NC—, HS— or HSCH₂CH₂S— group;

n is an integer having a value of from 2 to 5;

m is an integer having a value of zero or one;

x is an integer having a value of from 1 to 100; and y is an integer having a value of from 1 to 100.

Subgeneric to (I) are the compounds represented by the following subgeneric formulas:

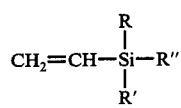
(I)(A)

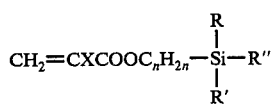
(I)(B)

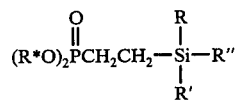
(I)(C)

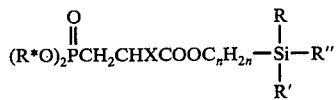
(I)(D)

Subgeneric to (II) are the compounds represented by the following subgeneric formulas:

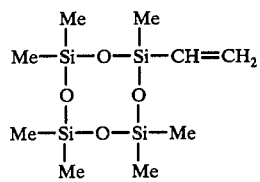
(II)(A)

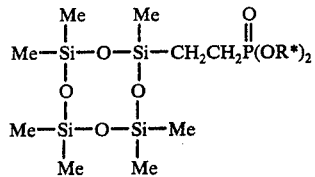
(II)(B)

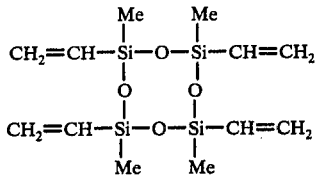
(II)(C)

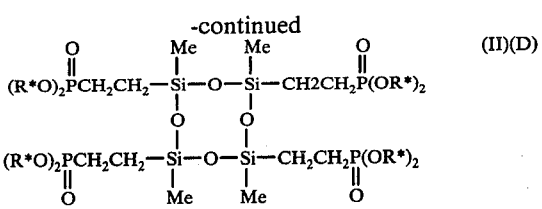
(II)(D)

Illustrative of suitable silicon compounds one can mention the following: beta-cyanoethyl triethoxysilane, gamma-mercaptopropyl triethoxysilane, gammaaminopropyl triethoxysilane, diethoxyphosphorylethyl methyl diethoxysilane, vinyl triethoxysilane, vinyl trimethoxysilane, vinyl triacetoxysilane, gamma-methacryloxypropyl trimethoxysilane, diethoxyphosphorylethyl heptamethyl cyclotetrasiloxane, beta-cyanoethyl trimethylsilane, N-gamma-(2-aminoethyl)-aminopropyl triethoxysilane, S-beta(2-mercaptoethyl) mercaptoethyl triethoxysilane, betamercaptoethyl triethoxysilane, vinyl methyl diethoxysilane, vinyl methyl di(trimethylsiloxy)silane, tetramethyl divinyl disiloxane, heptamethyl vinyl cyclotetrasiloxane, 1,3,5,7-tetramethyl 1,3,5,7-tetravinyl cyclotetrasiloxane, diethoxyphosphorylethyl methyl diethoxysilane, diethoxyphosphorylisopropyl triethoxysilane, diethoxyphosphorylethyl methyl di(trimethylsiloxy)silane, heptamethyl diethoxyphosphorylethyl cyclotetrasiloxane, 1,3,5,7-tetramethyl 1,3,5,7-tetra(diethoxyphosphorylethyl)cyclotetrasiloxane, 1,1,3,3-tetramethyl-1,3-di(diethoxyphosphorylethyl)disiloxane.

In a typical reaction, the prescribed amounts of dicarboxylic acid compounds, diols, modifiers and catalysts are charged to the reactor. The reaction mixture is then heated in an inert gas atmosphere at a temperature of from 180° C. to 210° C. to effect the initial esterification or transesterification. Thereafter, any excess glycol is removed and the transesterification is completed by heating the reaction mixture at a temperature of from about 225° C. to about 235° C. under a reduced pressure and an inert gas atmosphere. The second stage polycondensation reaction is then carried out by heating the reaction mixture at a temperature of from about 225° C. to about 325° C. under a reduced pressure of from about 0.1 mm. to about 20 mm. of mercury, preferably from about 0.1 mm. The use of the catalyst complexes or mixtures of this invention has often resulted in shorter overall reaction periods and in many instances decreased formation of glycol dimer.

The following examples serve to further illustrate the invention.

EXAMPLE 1

A mixture of 39.1 grams of dimethyl terephthalate, 32.3 grams of ethylene glycol, 0.0179 gram of zinc acetate dihydrate as transesterification catalyst and 0.0172 gram of 2-cyanoethyl triethoxysilane as polycondensation catalyst was heated under argon for 3 hours at 168° to 200° C. During this first stage transesterification reaction methanol was distilled from the reactor. The temperature was then raised to 218° to 230° C. and maintained for about one hour to complete the transesterification. Thereafter the temperature was increased while the pressure was gradually reduced to below 1 mm. of mercury and a temperature of 273° to 284° C. was maintained for 2 hours to carry out the second stage polycondensation reaction. A clear, white polyester having good draw and fiber properties was produced.

EXAMPLE 2

Following the procedure similar to that described in Example 1, a polyester was produced using 39.1 grams of dimethyl terephthalate, 32.8 grams of ethylene glycol, 0.0176 gram of zinc acetate dihydrate and 0.0202 gram of beta-diethoxyphosphorylethyl methyl diethoxysilane as the polycondensation catalyst. The polyester was white, had good cold draw and had an intrinsic viscosity of 0.60.

EXAMPLE 3

Following the procedure similar to that described in Example 1, a polyester was produced using 39.6 grams of dimethyl terephthalate, 32.4 grams of ethylene glycol, 0.0165 gram of zinc acetate dihydrate and 0.0158 gram of 3-aminopropyl triethoxysilane as the polycondensation catalyst. The polyester was light honey yellow in color and had an intrinsic viscosity of 0.60. It has a good cold draw and strength properties.

EXAMPLE 4

Following the procedure similar to that described in Example 1, 544 grams of a very faint yellow colored polyester was produced by the reaction of 736.9 grams of dimethyl terephthalate, 536.4 grams of ethylene glycol, 0.2716 gram of zinc acetate dihydrate and 0.2674 gram of 2-cyanoethyl triethoxysilane as the polycondensation catalyst. The transesterification was carried out under argon initially at 180° for 185° C. for 3.5 hours and then at 230° to 235° C. for 1.25 hours and the polycondensation was carried out at 277° to 285° C. for 3.5 hours. The white fibers, 139 denier, had good cold draw and strength properties.

A portion of this polyester was vacuum dried and blended in an extruder with 5 weight percent of the dyeability modifier poly[isopropyliminobis(trimethylene)succinate], produced as described in U.S. Pat. No. 3,886,230 (May 27, 1975, E. Marcus). The blend was spun through a spinnerette having 30 holes, each 0.02 inch in diameter at a takeup velocity of 550 feet per minute. The tow was stretched by heating over a hot shoe and a heated pin at 95° C. The stretch ratio was about 4.5:1. The pale yellow fibers, 104 denier, had good cold draw and strength properties.

What we claim is:

1. In a process for the manufacture of solid fiber-forming polyesters and copolyesters of dicarboxylic acid compounds and aliphatic glycols in the presence of catalysts, the improvement of using as polycondensation catalyst a silicon compound selected from the group consisting of:

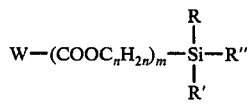
(I)

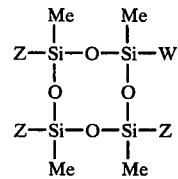
(II)

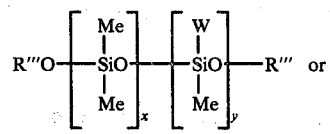
(III)

(IV) $QCH_2CH_2SiR_3$** wherein

W is $CH_2=CX-$ or

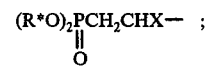

X is hydrogen or methyl and is methyl only when $m$ is one;

R* is alkyl or haloalkyl having from 1 to 4 carbon atoms;

R** is methyl, ethyl, butyl, acetoxy methoxy, ethoxy or butoxy;

R is methyl, ethyl, butyl or trimethylsiloxy;

R' is methyl, methoxy, ethoxy, butoxy or trimethylsiloxy;

R" is methoxy, ethoxy, butoxy, trimethylsiloxy or vinyldimethylsiloxy;

R''' is methyl, ethyl, butyl or trimethylsilyl; Me is methyl;

Z is methyl or W;

Q is an $NH_2CH_2-$, $NH_2CH_2CH_2NHCH_2-$, $NC-$, $HS-$ or $HSCH_2CH_2S-$ group;

$n$ is an integer having a value of from 2 to 5;

$m$ is an integer having a value of zero or one;

$x$ is an integer having a value of from 1 to 100; and $y$ is an integer having a value of from 1 to 100.

2. A process as claimed in claim 1, wherein the silicon compound is a compound of the general formula:

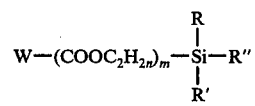

wherein W, R, R', R", $n$ and $m$ are as defined in claim 1.

3. A process as claimed in claim 1, wherein the silicon compound is a compound of the general formula:

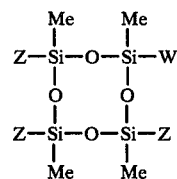

wherein Me, W and Z are as defined in claim 1.

4. A process as claimed in claim 1, wherein the silicon compound is a compound of the general formula:

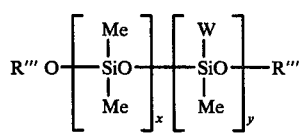

wherein Me, W, R''', $x$ and $y$ are as defined in claim 1.

5. A process as claimed in claim 1, wherein the silicon compound is a compound of the general formula:

QCH$_2$CH$_2$SiR$_2$** wherein Q and R** are as defined in claim 1.

6. A process as claimed in claim 1, wherein the silicon compound is beta-diethoxyphosphorylethyl methyl diethoxysilane.

7. A process as claimed in claim 1, wherein the silicon compound is 2-cyanoethyl triethoxysilane.

8. A process as claimed in claim 1, wherein the silicon compound is 3-aminopropyl triethoxysilane.

* * * * *

UNITED STATES PATENT OFFICE
CERTIFICATE OF CORRECTION

Patent No. 4,077,944   Dated March 7, 1978

Inventor(s) Kurt Weinberg; Gordon Carlton Johnson

It is certified that error appears in the above-identified patent and that said Letters Patent are hereby corrected as shown below:

Column 7, line 3, the formula should read:

$$QCH_2CH_2SiR_3^{**}$$

Signed and Sealed this

Twenty-ninth Day of August 1978

[SEAL]

Attest:

RUTH C. MASON
Attesting Officer

DONALD W. BANNER
Commissioner of Patents and Trademarks